United States Patent [19]
Gatto et al.

[11] Patent Number: 5,973,799
[45] Date of Patent: Oct. 26, 1999

[54] ID CARD IMAGE READER

[75] Inventors: Jean-Marie Gatto, London, United Kingdom; Thierry Brunet De Courssou, Palo Alto, Calif.

[73] Assignee: Cyberscan Technology, Inc., Palo Alto, Calif.

[21] Appl. No.: 08/902,872

[22] Filed: Jul. 30, 1997

[51] Int. Cl.⁶ .................................................. H04N 1/04
[52] U.S. Cl. ............................................................ 358/498
[58] Field of Search .................................. 358/498, 496, 358/494, 483, 482, 474, 471; 271/314, 272; 250/208.1

[56] References Cited

U.S. PATENT DOCUMENTS

| | | | |
|---|---|---|---|
| 4,835,619 | 5/1989 | Kobori et al. ............................ | 358/294 |
| 4,963,726 | 10/1990 | Checchetti ............................... | 358/496 |
| 5,103,322 | 4/1992 | Beck et al. ............................... | 358/496 |
| 5,125,047 | 6/1992 | Ito et al. .................................. | 358/498 |
| 5,475,504 | 12/1995 | Ogura et al. ............................ | 358/498 |
| 5,579,128 | 11/1996 | Cheng ....................................... | 358/471 |
| 5,711,516 | 1/1998 | Pan .......................................... | 358/496 |
| 5,805,307 | 9/1998 | Park ......................................... | 358/471 |

*Primary Examiner*—Amelia Au
*Assistant Examiner*—Jingge Wu
*Attorney, Agent, or Firm*—Young Law Firm, P.C.

[57] ABSTRACT

A high-resolution high-speed image reader to digitize information printed on personal identification cards or other substantially rigid documents. The system is engineered to provide means for reading ID card printed information. The system may be mounted in a bay of a personal computer, may be implemented in a counter top configuration, may be integrated for mounting into an automatic teller machine, or may be configured for a battery operated portable configurations or for a vehicle-transported configuration.

23 Claims, 6 Drawing Sheets

ID CARD IMAGE READER

BACKGROUND OF THE INVENTION

1. Field of the Invention

The invention pertains to the field of personal identification systems.

2. Description of the Related Art

Many personal identification techniques have been invented to avoid fraud. The most promising identification technique is based on smart cards, wherein a complete microprocessor is integrated in a module that fits in the thickness of a standard plastic credit card. The operations performed by the microprocessor and the exchange of information with a host computer via a reader are entirely secured using robust encryption techniques. There is also a need to store significant amounts of personal information such as for, example, medical history. Again, smart cards are ideally suited for this type of data storage.

Smart cards are well established in Europe and are starting to appear in other parts of the world. However, despite their obvious benefits, smart cards have not been adopted for identical applications in all countries. The principal obstacle to wide adoption of smart cards is the complexity, fragility and cost of the hardware devices. The smart module as well as the reader can be too easily damaged if minimal caution is not taken.

A very promising technique that is based on printing very fine symbols directly on the surface of the card together with text identification data, photograph, finger print, signature, and logos is a robust and inexpensive solution to the personal identification problem. For example, Symbol Technology has created the PDF code and Xerox has created the DataGlyph code. The PDF code is a two-dimensional code that is used for the identification of factory items, and is read using handheld laser beam scanning technique. The DataGlyph code, a two-dimensional code, patented by Xerox, (U.S. Pat. No. 5,245,165), is used to provide additional information on office forms that are scanned using a conventional general-purpose document reader.

The DataGlyph code is composed of symbols almost invisible to the naked eye and the general patterns typically appear as uniform gray shading that can be inserted for filling gaps between large letters, logos or photographs. Printed at 300 dpi, these patterns store about 400 bytes per square inch. The DataGlyph code is, therefore, ideally suited to be printed on personal identification plastic cards using 300 dpi thermal transfer printers, or higher resolution printing techniques, for storing encrypted data such as medical information, fingerprints, photographs, signatures, and any other biometrics digitized data.

Once the printed information is digitized using a document-imaging scanner, a pattern recognition algorithm identifies the symbols and translates them back into their binary form. Robust redundancy algorithms such as the Cross-Interleaved Reed-Solomon code used in spacecraft transmissions and CD-ROM readers allow a high percentage of symbol errors to occur before the encoded original message is unrecoverable. Typically, error rates up to 30% can still result in successful decoding. Each user determines the amount of error correction to be used, depending on the expected damage or abuse that may be sustained by the card in that application.

This tolerance to a high rate of errors make this personal identification technique extremely robust even in harsh environments. The plastic cards are not affected by dust, humidity, corrosion, temperature or sweat. Tampering is rapidly identified. Typically, printed cards cost $\frac{1}{10}$th the cost of smart cards.

Other symbol-based technologies that make use of laser beam techniques to print and read the information are less robust and considerably more expensive.

The devices in the prior art that can digitize information printed on personal identification cards are general-purpose document scanners that are not suited for heavy-duty usage and fast reading of ID cards.

SUMMARY OF THE INVENTION

The general-purpose document scanners of the prior art are unsuited for heavy-duty usage or for reliably reading, at high speed, personal identification cards in all possible configurations. While reading smart cards is simply a matter of guiding the card to a full stop, matting contacts between the smart chip and the reader's connector, then performing an electrical exchange of information, the reading of a printed card involves mastering a far greater number of engineering disciplines, such as high speed motion control, precision alignment, anti-vibration control, micro-mechanics, optics, image sensing, and smart modularity for ease of cleaning by operator.

The system herein described provides a means for reading a printed image on a personal identification card or other substantially rigid document. The system according to the present invention may be mounted in an open bay of a personal computer or within an ATM (Automatic Teller Machine). The system may also be embodied in a counter top configuration, in a battery-operated portable or wearable configuration, or may be transported by a vehicle. The scanning speed for an entire ID card is typically on the order of one second or less. The system can be mounted at any angle.

The design of the system according to the present invention minimizes the number of parts and the cost, avoids the need for oiling and facilitates cleaning. For example, linear guides have been excluded because of their high cost, oiling requirement and sensitivity to dust. Displacement of the card is preferred to displacement of the image sensor, to avoid expensive linear guides to move the heavy image sensor. Moreover, displacement of the card using a feed roller is preferred to pushing the card with a motorized finger, to avoid linear guides and to obtain high speed feeding.

Anti-vibration devices are incorporated in order to obtain evenly spaced digitized lines. A pendulum attachment for the image sensor is used to ensure a high displacement amplitude and even pressure on the card.

According to an exemplary embodiment, the image reader according to the present invention comprises a contact image sensor protected by transparent glass, the contact image sensor including an image sensitive area located on a line of focus at an outer surface of the transparent glass, motorized means for feeding, in one of a forward and a reverse direction, a substantially rigid document over the line of focus at a controlled feed rate and with a controlled pressure against the transparent glass, guiding means for ensuring precise alignment and guidance of the document while the document is being fed over the line of focus of the contact image sensor, and electronic control means for controlling the contact image sensor and the motorized feeding means.

The controlled feed rate of the document by the motorized feeding means and the precise alignment of the document by the guiding means allows the contact image sensor to generate an electronic signal from which a digitized image of the document may be derived while the document is being fed over the line of focus of the contact image sensor.

The image reader according to the present invention may also comprises two flanges, the two flanges being attached at right angles to a flat base, a feed roller disposed between and supported by the flanges, the feed roller being either coated or lined with a gripping material for gripping the document, lever-lock bearings disposed on each end of the feed roller, the lever-lock bearings allowing free rotation of the feed roller along its longitudinal axis and locking the feed roller in position in the flanges, each of the two flanges having corresponding openings to accommodate fixing and removing the lever-lock bearings therein, and means for holding the contact image sensor between the flanges and against the feed roller in a predetermined position, at a predetermined angle and with a predetermined pressure.

The lever-lock bearings, in this manner, enable convenient unlocking and removal of the feed roller for easy access and cleaning of the transparent glass protecting the contact image sensor, and for subsequent replacement and locking of the feed roller. The lever-lock bearings comprise a circular surface designed to fit in a mating opening in the flanges.

Each lever-lock bearing comprises at least one flat portion which is aligned with at least one corresponding flat portion of a corresponding flange when the lever-lock bearing is in an unlocked position, and which is rotated 90 degrees relative to at least one flat portion of the corresponding lever-lock bearing when the lever-lock bearing is in a locked position, the lever-lock bearings allowing free rotation of the feed roller when the lever-lock bearings are in a locked position relative to the flanges.

Each of the lever-lock bearings comprises groves, so that an operator's thumbs may readily and selectively rotate the lever-lock bearings to the locked and unlocked position.

The lever-lock bearings, according to an exemplary embodiment, are made of injection-molded plastic material which offers low friction without requiring lubricant to enable a free rotation of the feed roller.

According to another exemplary embodiment of the present invention, the gripping material may be rubber, silicone or foam, among other suitable materials.

Retaining means may be provided, for securing the contact image sensor in a stable position when the feed roller is removed, thereby enabling easy cleaning of the transparent glass protecting the contact image sensor and easy repositioning and locking of the feed roller.

Other embodiments of the present invention include anti-scratch means for avoiding damaging scratches on the document while the document is fed through the image reader. Detection and activation means may be provided, for automatically activating the feed roller to enable document feeding as soon as the document is detected to have been properly placed and aligned in the image reader. An insertion and retrieval slot may also be provided, where the document is inserted and retrieved by human hands, together with transport means for transporting the document away from the slot. In this manner, the feed roller and the contact image sensor can be placed at a safe distance from the slot to prevent tampering therewith.

Deep input guide means may be provided, the deep input guide means creating a small gap immediately over the focus line of the contact image sensor to avoid contact between the document and the glass, thereby avoiding scratches on the glass and a depositing residue on the focus line.

According to another embodiment, the image reader further comprises processing means, display means and human interaction means, whereby at least selected portions of a digitized image of the document can be displayed on a high resolution screen together with other decoded information, in order to offer a totally integrated portable solution.

BRIEF DESCRIPTION OF THE DRAWING

For a further understanding of the objects and advantages of the present invention, reference should be made to the following detailed description, taken in conjunction with the accompanying figures.

DETAILED DESCRIPTION OF THE INVENTION

The ID Card Image Reader is composed of an image sensor, a feed mechanism, means for precisely guiding the ID card, electronics means for controlling the feed mechanism, electronics means for deriving an image of the printed information from the signals delivered by the image sensor, and a packaging to suit various usage configurations.

Figure 1:
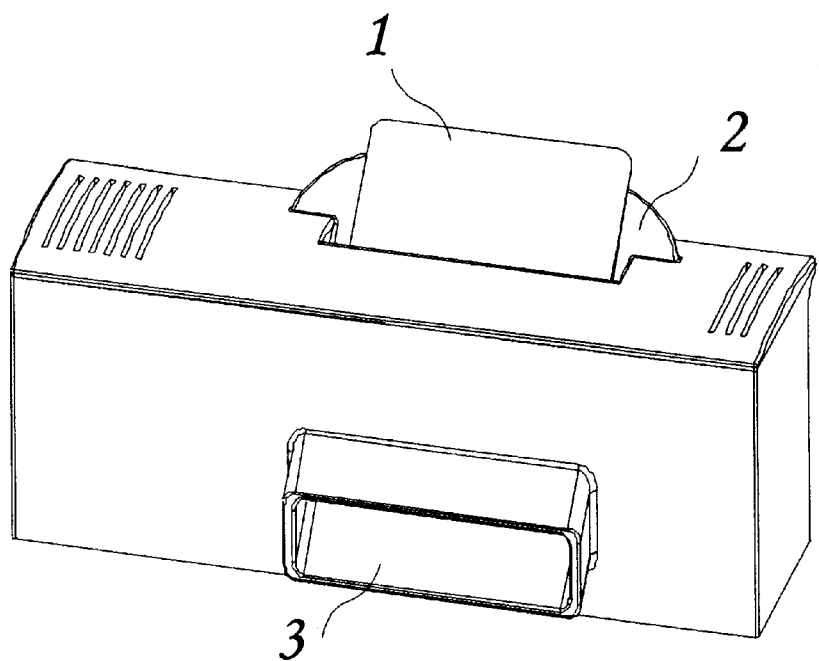
FIG. 1 shows a typical configuration of the ID Card Image Reader according to the present invention, configured for counter-top operation.

FIG. 1 shows a typical embodiment of the present invention, configured for countertop operation. In this configuration, the ID Card Image Reader is enclosed in a case that contains an image sensor, a feed mechanism, means for precisely guiding the ID card, electronics means for controlling the feed mechanism and front-end electronics means for deriving an image of the printed information. Back-end electronics means for processing and displaying the image are located in a host personal computer. The ID Card Image Reader communicates with the host PC via a standard high-speed data link such as a parallel port in the ECP mode or USB. The ID card 1 is introduced in the input guide 2 and aligns itself by gravity before detecting means automatically enable the motorized feed. The ID card exits the case through the output guide 3. In other embodiments where gravity cannot be used to position the ID card, extended guides and transport are incorporated to align the ID card and bring it in contact with the ID card reader mechanism.

Figure 2:
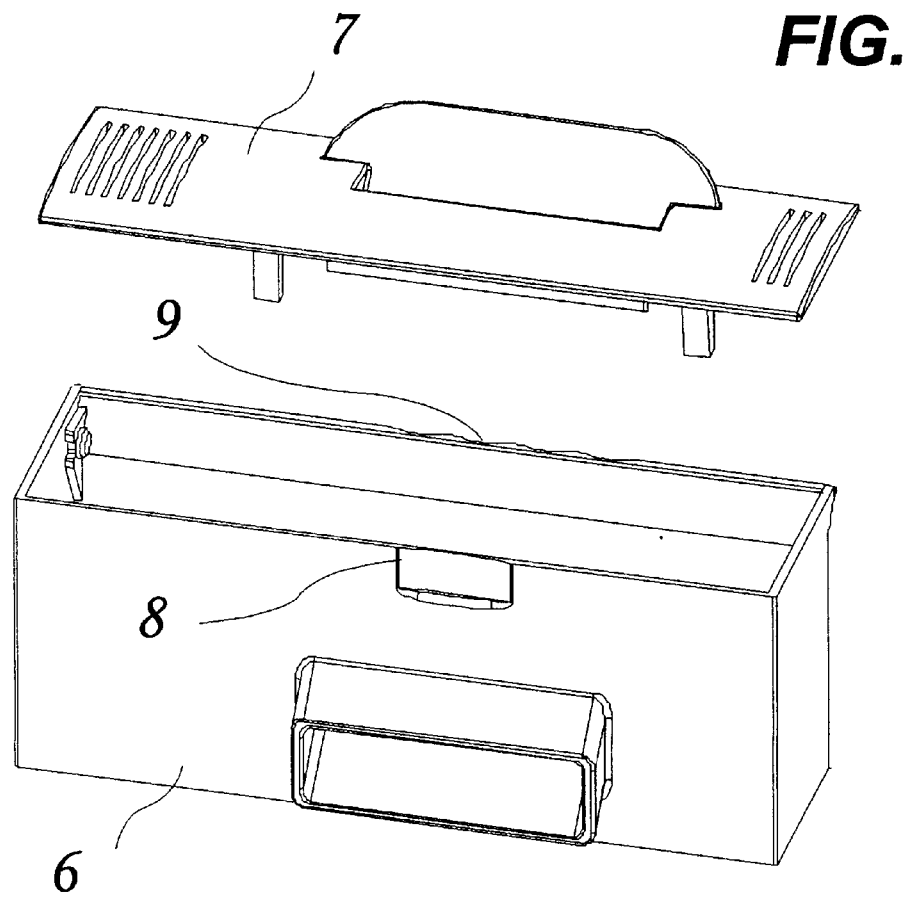
FIG. 2 shows a counter-top ID Card Image Reader of FIG. 1 with its top cover removed for easy cleaning access.

FIG. 2 shows a counter-top ID Card Image Reader with the top cover 7 removed for easy cleaning access. The cover 7 can be separated from the base 6 with ease by grabbing it by hand using the special embossments 8 and 9 for placement of fingers.

Figure 3:
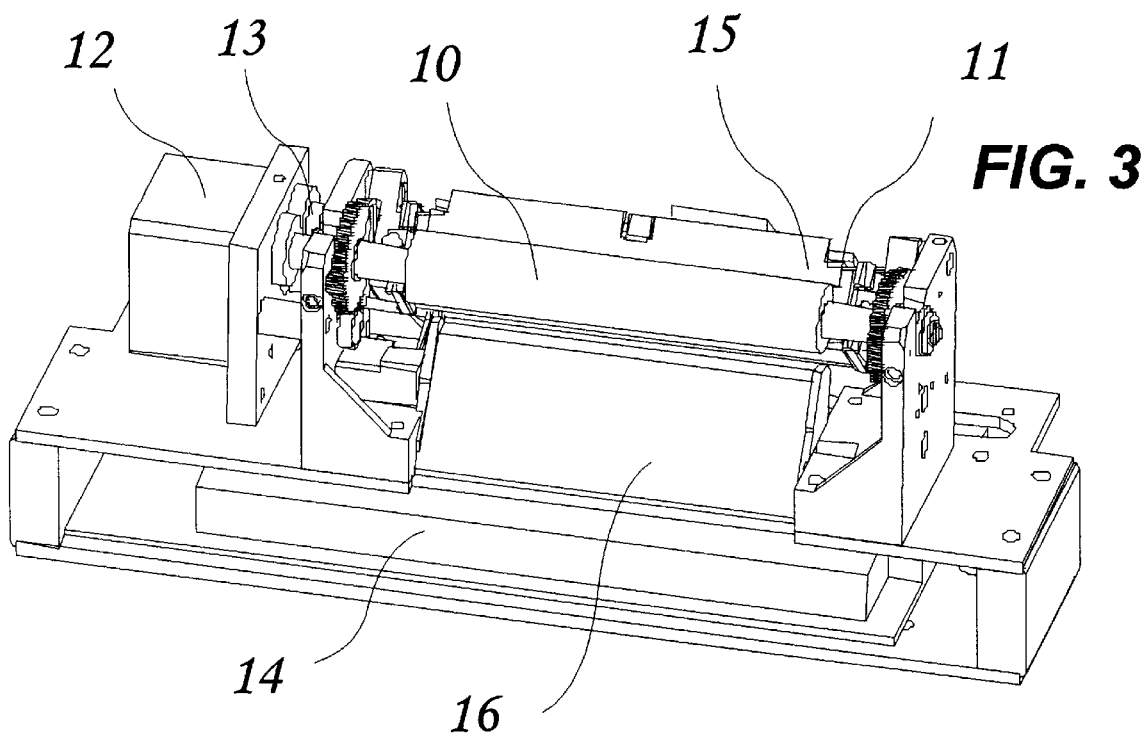
FIG. 3 shows the main inner components of a counter top configuration of an ID Card Image Reader.

FIG. 3 shows the main inner components of a counter top configuration of an ID Card Image Reader. The feed roller 10 is driven by a motor 12 and a set of gears 13. The contact image sensor 11 presses against the feed roller 10. A deep input guide 15 guides the ID card to the point of contact between the feed roller 10 and the glass of the contact image sensor 11. The deep exit guide 16 collects the ID card immediately after it exits the feed roller and ejects it by gravity. The control electronics 14 control the rotation of the feed roller, control the contact image sensor and transform the contact image sensor's video signals into digitized pixels that are transmitted to the host personal computer for further processing.

Figure 4:
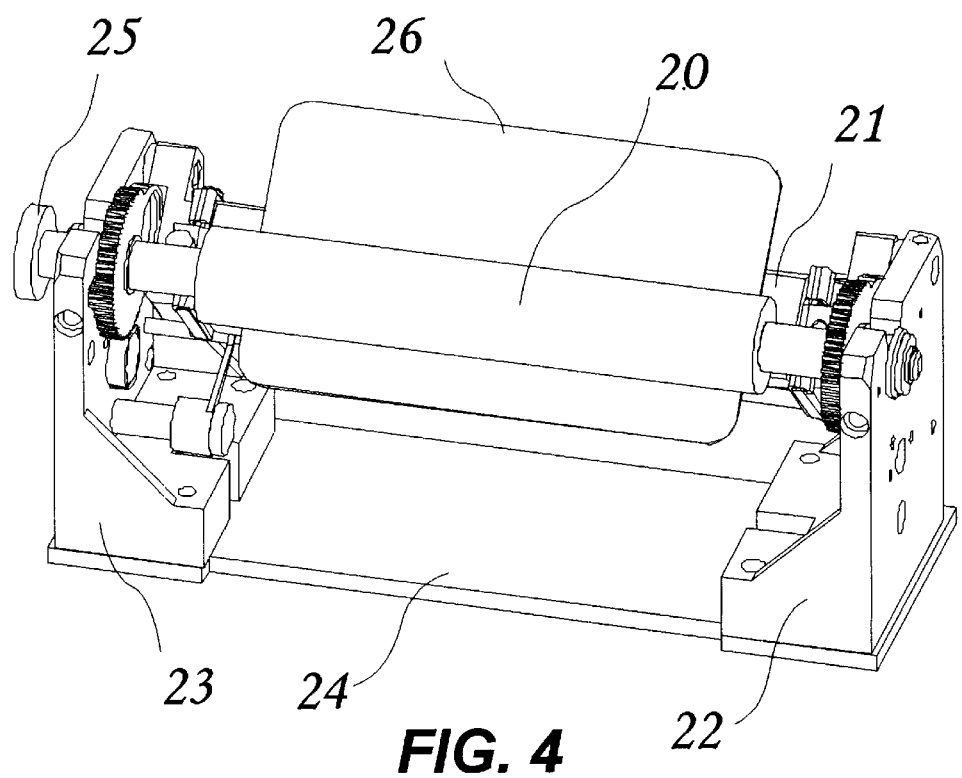
FIG. 4 shows details of the feeding mechanism.

FIG. 4 shows details of the feeding mechanism. The feed roller 20 and the contact image sensor 21 are held in position by two side mounting flanges 22 and 23 fixed on a flat base 24. The gear 25 rotates the feed roller 20. This simple construction is very modular and variations thereof are easily made to suit various ID Card Image Reader mounting configurations.

Figure 5:
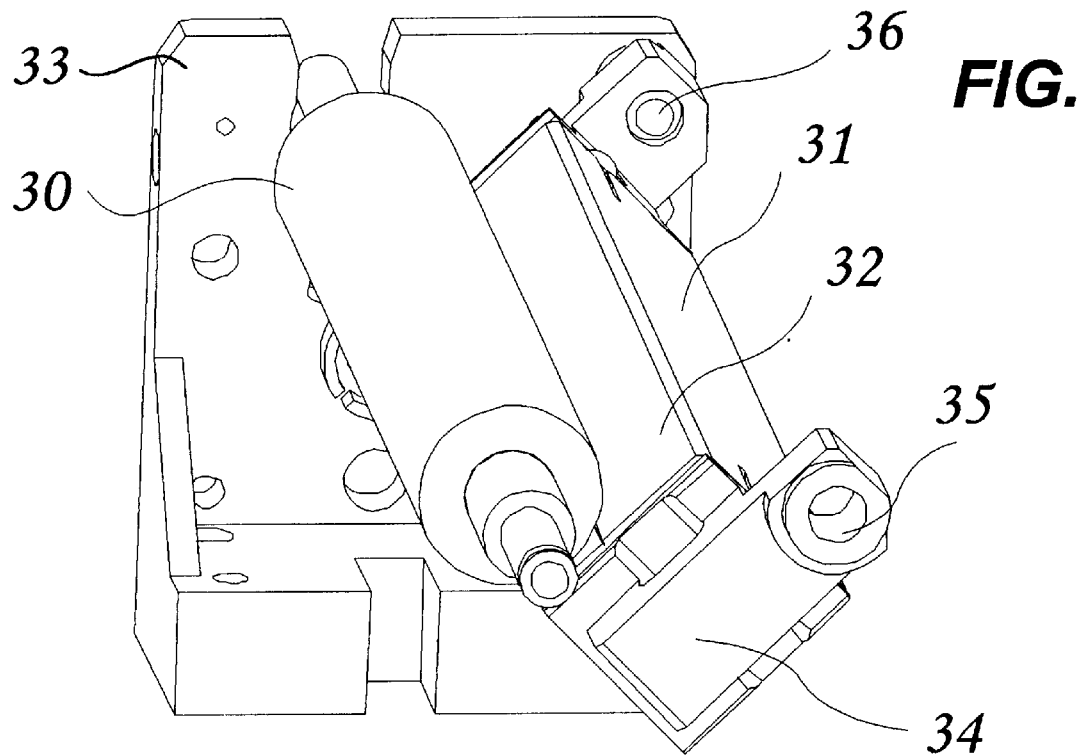
FIG. 5 shows the pendulum attachment for the image sensor.

FIG. 5 shows the pendulum attachment for the image sensor. The image sensor casing 31 is fitted with two side brackets 34 on each of its extremities. The side brackets 34 have a circular opening 35 that allows free rotation around a pin 36 that is mounted on the flanges 33. With this attachment, the contact image sensor can swing backward and forward in a pendulum fashion, parallel to the main axis of the feed roller 30. The glass 32 of the contact image sensor is maintained against the feed roller by springs that push the image sensor case in the appropriate direction. Geometry is calculated such as the line of focus of the contact image sensor falls parallel to the line of contact between the feed roller and the glass. The offset between the line of contact of the feed roller and the glass, and the line of focus can be precisely adjusted by properly positioning the mounting brackets 34.

A retainer pin is placed on the mounting flange to stop the contact image sensor swing when the feed roller is removed. This retainer secures the image sensor in a stable position when the feed roller is removed, thereby enabling easy cleaning of the contact image sensor's glass, and easy repositioning and locking of the feed roller.

Pendulum attachment offers the advantage of smooth non-sticking high amplitude displacement to accommodate thickness of ID cards and closer tolerance to avoid excessive slack and float that amplify vibration and create a knocking noise.

Figure 6:
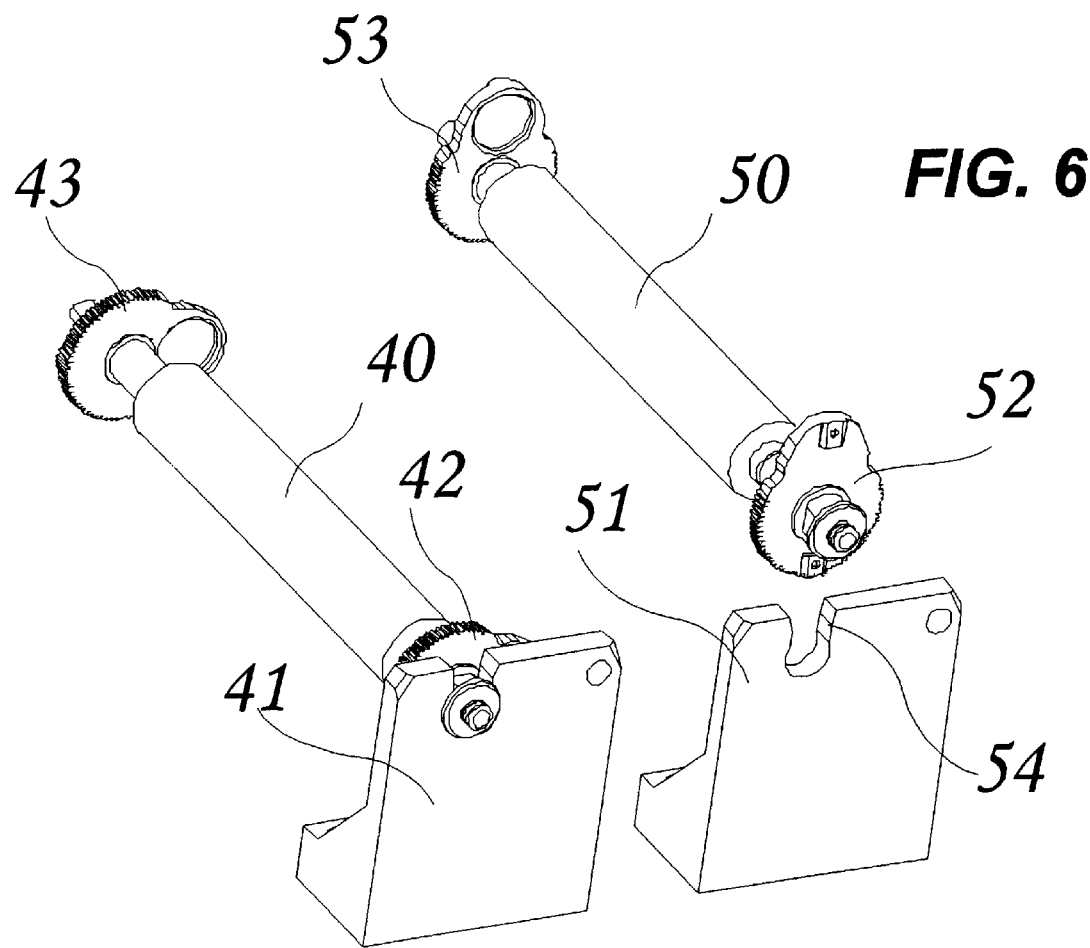
FIG. 6 shows two views of the lever-lock bearing attachment for the feed roller.

FIG. 6 shows the lever-lock bearing attachment for the feed roller to enable easy removal of the feed roller for cleaning the glass of the contact image sensor. Lever-lock bearings 42 and 43 are placed on each of the extremities of the feed roller 40.

In the left-hand side view of FIG. 6, the lever-lock bearings are shown locked-in-place in the mounting flange 41. The lever-lock bearings 42 and 43 enable free rotation of the feed roller around its main axis when mounted on the mounting flanges 41.

In the right hand side view of FIG. 6, the lever-lock bearings 52 and 53 are shown in the unlocked position. The feed roller 50 can then be easily removed by lifting up and holding with the fingers the lever part of the lever-lock bearings 52 and 53. The lever-lock bearings 52 and 53 slide past the flat portion 54 of the flange 41 as the feed roller 50 is lifted out from the flanges 41.

Figure 7:
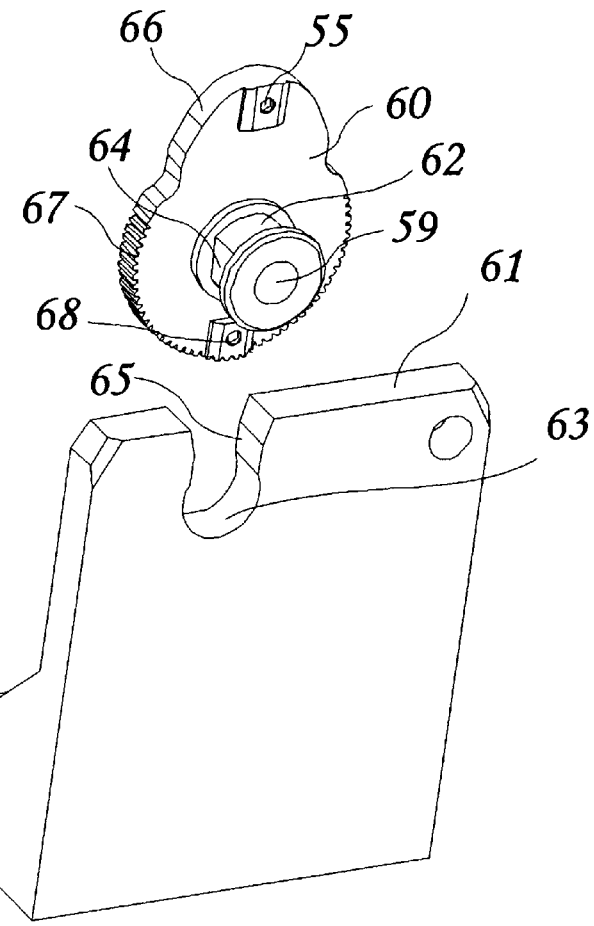
FIG. 7 shows a detail view of a lever-lock bearing.

FIG. 7 shows a detail view of a lever-lock bearing. The circular surface 62 of the lever-lock bearing 60 is designed to sit in a mating opening 63 of the mounting flange 61. In the unlocked position as shown in FIG. 7, the flat portion 64 of the lever-lock bearing is aligned with the flat portion 65 of the flange's opening 63, thereby allowing the introduction of the lever-lock into the flange. When the flat portion 64 of the lever lock bearing is rotated 90 degrees relative to the flat 65 of the mounting flange, the lever-lock bearing is firmly locked into place while allowing free rotation of the feed roller axle in the lever-lock bearing cavity 59. Groves 67 are placed on the lever-lock bearing to enable easy rotation for locking and unlocking using the operators' thumbs. The lever 66 is designed such as to allow easy catching by fingers to lift the feed roller and put it back into place. The lever-lock bearings are injection-molded of a plastic material such as Nylon 66 or Nylon 66 filled with molybdenum disulfide ($MoS_2$), that offers low friction without need of lubricant to enable free feed roller rotation. Two small holes 55 and 68 are placed on the lever-lock bearings 52 that engage in two corresponding pins on the flanges 61 to offer a stable locking position to provide a click-feel to the operator.

Figure 8:
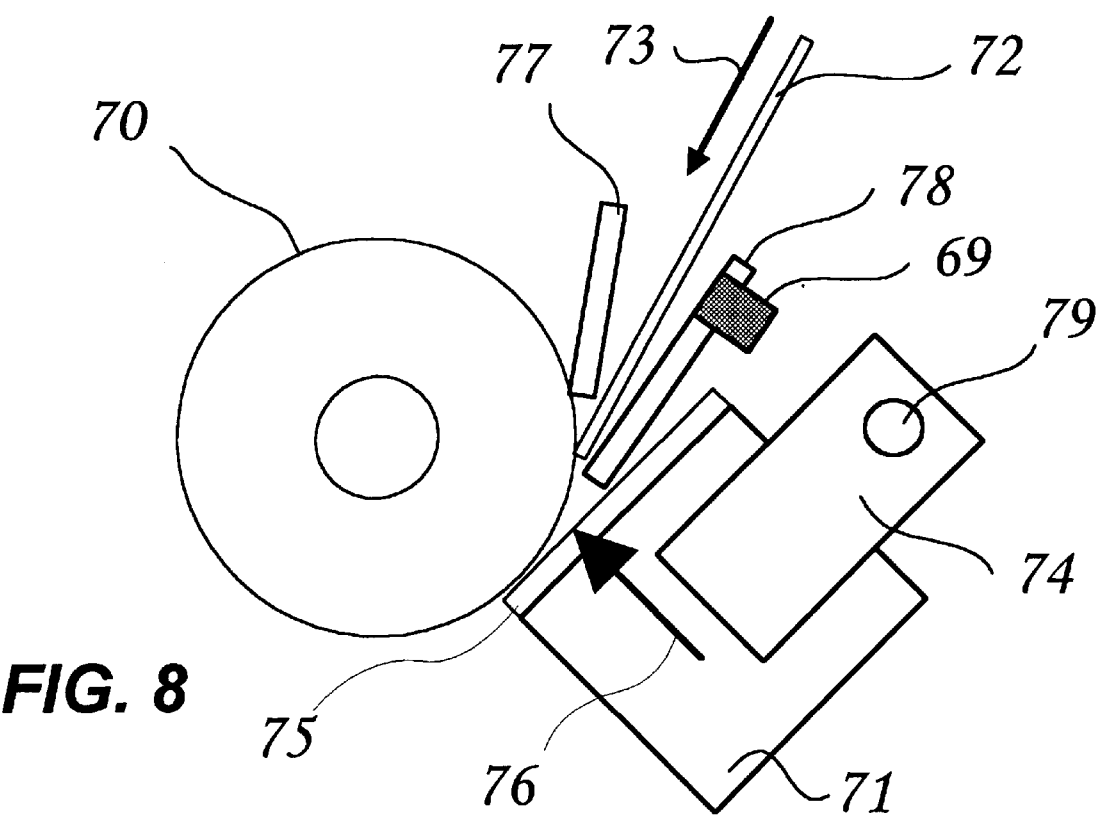
FIG. 8 shows a detail view of the deep input guide and the anti-scratch system.

FIG. 8 shows a detail view of the deep input guide and the anti-scratch system. The feed roller 70 is pressed against the glass 75 of the contact image sensor 71. The contact image sensors 71 are mounted onto the side bracket 74 having a pendulum fixation point 79. The contact image sensor image sensitive area or focus line that is located at the tip of arrow 76 is not is contact with the feed roller 70. When an ID card 72 is introduced in the direction 73, the deep input guides 78 and 77 guide the paper until it stops when it hits the feed roller 70. A proximity detector 69 signals the presence of an ID card to the electronic control circuits.

Figure 9:
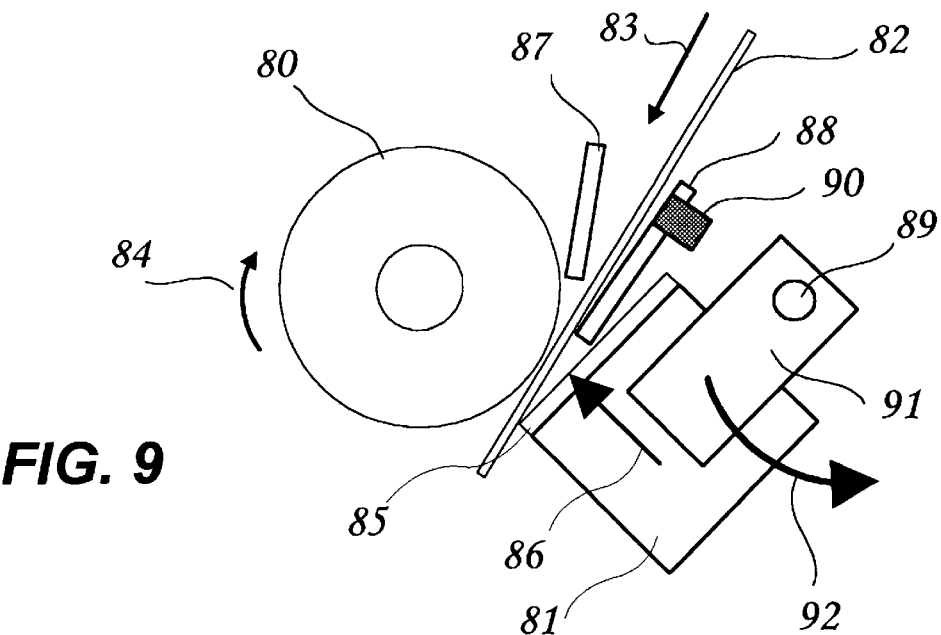
FIG. 9 shows a detail view of the deep input guide when the feed roller is driving an ID card.

FIG. 9 shows a detail view of the deep input guide when the feed roller is driving an ID card. As soon as the control electronics activate the rotation of the feed roller 80 in the direction 84, the ID card 82 is snatched by the feed roller and is pulled in the direction 83. The contact image sensor 81 that is pivotally held by the bracket 91 swings backward about the pendulum fixation point 89 in the direction 92 to clear a gap over the glass 85, to allow passage of the ID card 82.

The deep input guides 87 and 88 are positioned in such a way as to create a small gap immediately over the focus line 86 of the contact image sensor 81 in order to avoid direct contact over the image sensitive area, thereby avoiding scratching of the glass at this location.

The deep input guides 87 and 88 are further lined with some felt-type material to clean the surface of the ID card, to reduce the card vibrations and avoid creating scratches on the card.

The feed roller is lined with a soft silicone material to reduce card vibrations. The motor gears integrate brakes to reduce vibrations created by the motor. A soft brake is also fitted at each of the extremities of the feed roller to reduce vibrations.

Figure 10:
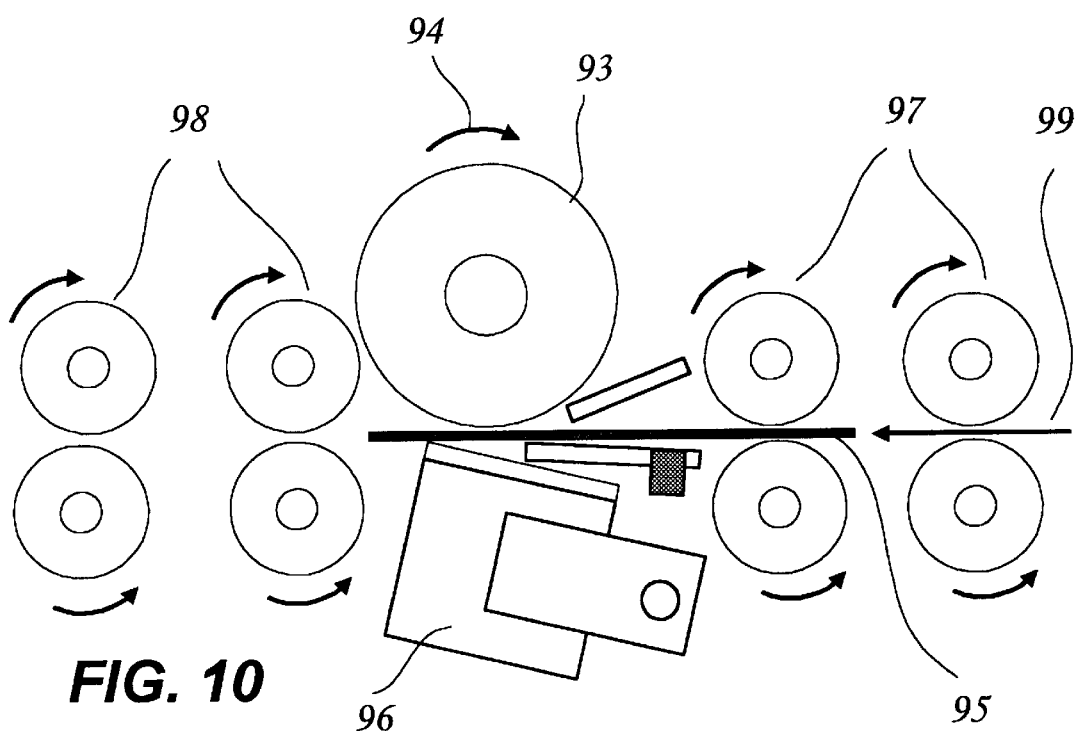
FIG. 10 shows a schematic of a transport system to carry the ID card from a distance to the ID Card Image Reader and away from the ID Card Image Reader.

FIG. 10 shows a schematic of a transport system to carry the ID card from a distance to the ID Card Image Reader and away from the ID Card Image Reader. The ID Card Image Reader described in this document is capable of being incorporated in systems whereby it is not possible to introduce the card by hand until it can be directly snatched by the feed roller. For this situation, small motorized transport input rollers 97 can be installed to bring the ID card in contact with the main feed roller 93. Motorized output rollers 98 can also be installed to take away the ID card immediately after it leaves the main feed roller 93.

In an alternative embodiment, the card is exited through the input of the ID image reader by reversal of the motor feed.

Figure 11:
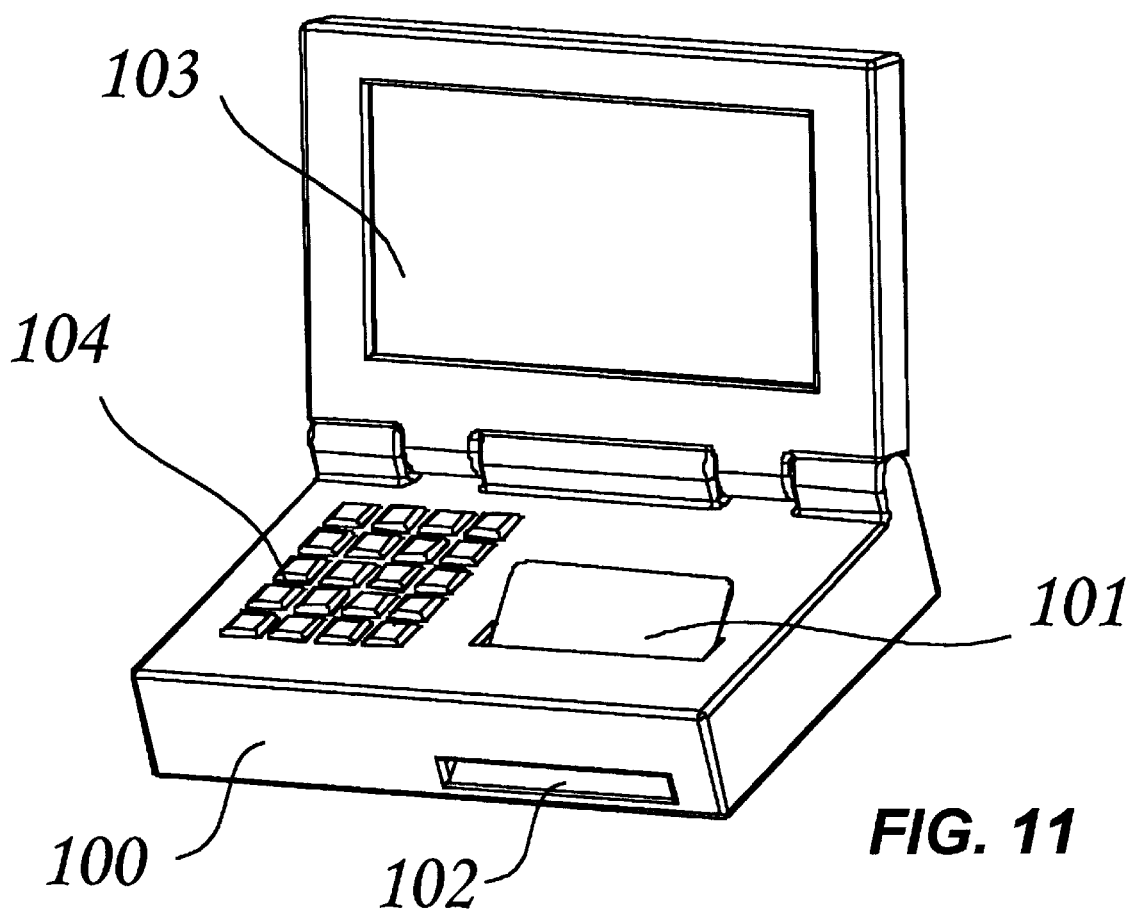
FIG. 11 is a perspective view of a portable ID Card Image Reader.

FIG. 11 is a perspective view of a portable ID Card Image Reader. The main case 100 contains the electronic circuits necessary to control the image reader 101, decode the card image data, process the data and display information on a high resolution graphics display 103. A keyboard 104 allows user interaction. In this embodiment, the ID card exits by the opening 102.

Figure 12:
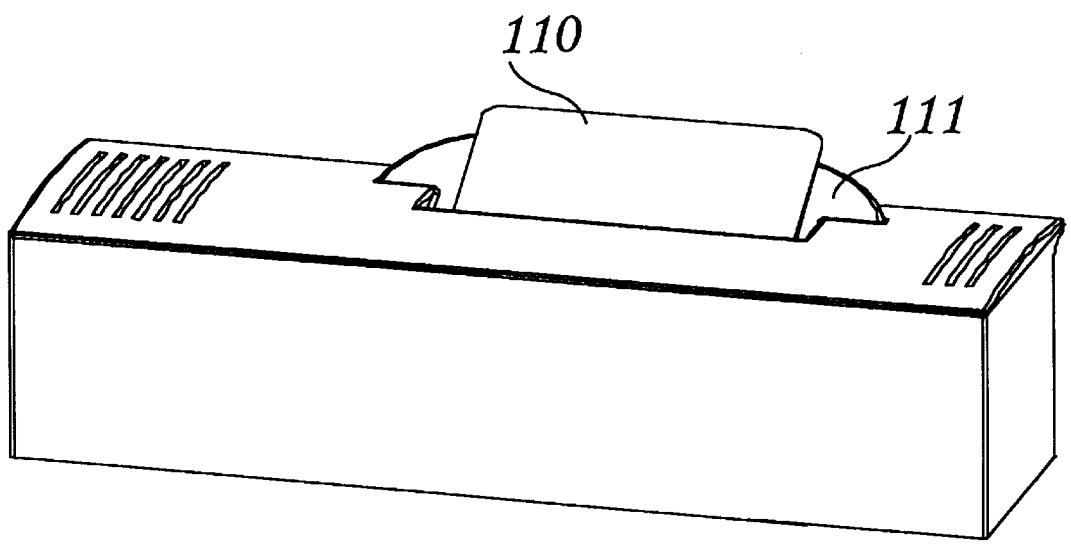
FIG. 12 is a perspective view of an ID Card Image Reader where the ID Card is ejected through the input by feed reversal.

In FIG. 12, the ID Card 110 is ejected through the reader input 111 by feed reversal.

CONCLUSIONS

The ID Card Image Reader described above has all the attributes of simplicity, modularity, robustness, reliability, small size and speed to provide an ideal solution for counter top readers, personal computer bay-mounted readers, automatic teller machine readers, portable readers and vehicle transportable readers. The reader can be mass-produced at a very low price. It, therefore, enables, together with low cost printed ID cards, a wide diffusion of very robust and economical ID verification devices for banks, police, hospitals, shops, etc., especially for developing countries.

While the foregoing detailed description has described several embodiments of this invention, it is to be understood that the above description is illustrative only and not limiting of the disclosed invention. For example, the shape of the mounting flanges and of the lever-lock bearings may vary from that described and illustrated, consistent with their stated function without, however, departing from the spirit and scope of the present invention. Likewise, while a CIS (Contact Image Sensor) has been used as an example of an image sensor that is appropriate for the present invention, it is to be understood that most any suitable image sensor may be used. A number of other modifications will no doubt occur to persons of skill in this art. All such modifications, however, should be deemed to fall within the scope of the present invention. Thus, the invention is to be limited only by the claims as set forth below.

What is claimed is:

1. An image reader for reading a substantially rigid document, comprising:

a contact image sensor protected by transparent glass, the contact image sensor including an image sensitive area located on a line of focus at an outer surface of the transparent glass, the contact image sensor being adapted to undergo a pendulum-like swinging motion;

motorized means for feeding, in one of a forward and a reverse direction, the substantially rigid document over the line of focus at a controlled feed rate and with a controlled pressure against the transparent glass;

deep input guiding means for ensuring precise alignment and guidance of the document while the document is being fed over the line of focus of the contact image sensor, the guiding means creating a small gap immediately over the line of focus to avoid contact between the document and the image sensitive area, the guiding means being disposed such that the document, when introduced into the guiding means, causes the contact image sensor to undergo the swinging motion to accommodate a thickness of the substantially rigid document between the line of focus and the motorized feeding means while maintaining the small gap over the line of focus; and electronic control means for controlling the contact image sensor and the motorized feeding means, whereby, the controlled feed rate of the document by the motorized feeding means and the precise alignment of the document by the guiding means allows the contact image sensor to generate an electronic signal from which a digitized image of the document may be derived while the document is being fed over the line of focus of the contact image sensor.

2. An image reader according to claim 1, further comprising:

two flanges, the two flanges being attached at right angles to a flat base;

a feed roller disposed between and supported by the flanges, the feed roller being one of coated and lined with a gripping material for gripping the document;

lever-lock bearings disposed on each end of the feed roller, the lever-lock bearings allowing free rotation of the feed roller along its longitudinal axis and locking the feed roller in position in the flanges, each of the two flanges having corresponding openings to accommodate fixing and removing the lever-lock bearings therein; and means for holding the contact image sensor between the flanges and against the feed roller in a predetermined position, at a predetermined angle and with a predetermined pressure, whereby the lever-lock bearings enable convenient unlocking and removal of the feed roller for easy access and cleaning of the transparent glass protecting the contact image sensor, and for subsequent replacement and locking of the feed roller.

3. An image reader according to claim 2, wherein the gripping material is selected from the group consisting of rubber, silicone and foam.

4. An image reader according to claim 2, further comprising retaining means for securing the contact image sensor in a stable position when the feed roller is removed, thereby enabling easy cleaning of the transparent glass protecting the contact image sensor and easy repositioning and locking of the feed roller.

5. An image reader according to claim 1, further comprising detection and activation means for automatically activating the feed roller to enable document feeding as soon as the document is detected to have been properly placed and aligned in the image reader.

6. A image reader according to claim 1, further comprising:

an insertion and retrieval slot where the document is inserted and retrieved by human hands; and transport means for transporting the document at least one of away and back from the slot, whereby, the feed roller and the contact image sensor can be placed at a safe distance from the slot to prevent tampering therewith.

7. An image reader according to claim 1, wherein at least the contact image sensor and the guiding means have generally wallet-size dimensions to accommodate personal identification cards.

8. An image reader according to claim 2, wherein the lever-lock bearings comprise a circular surface designed to fit in corresponding mating opening in the flanges.

9. An image reader according to claim 2, wherein each lever-lock bearing comprises at least one flat portion which is aligned with at least one corresponding flat portion of a corresponding flange when the lever-lock bearing is in an unlocked position, and which is rotated 90 degrees relative to the at least one flat portion of the corresponding lever-lock bearing when the lever-lock bearing is in a locked position, the lever-lock bearings allowing free rotation of the feed roller when the lever-lock bearings are in a locked position relative to the flanges.

10. An image reader according to claim 9, wherein each of the lever-lock bearings comprise groves, whereby an operator's thumbs may readily and selectively rotate the lever-lock bearings to the locked and unlocked position.

11. An image reader according to claim 2, wherein the lever-lock bearings are made of injection-molded plastic material, whereby, the injection-molded material offers low friction without requiring lubricant to enable a free rotation of the feed roller.

12. An image reader according to claim 1, further comprising processing means, display means and human interaction means, whereby at least selected portions of a digitized image of the document can be displayed on a high resolution screen together with other decoded information, in order to offer a totally integrated portable solution.

13. An image reader for reading a substantially rigid document, comprising:

a feed roller having two extremities;

driving means for driving the feed roller, the driving means being disposed adjacent one of the two extremities of the feed roller;

two lever-lock bearings, each of the two lever-lock bearing being attached to a corresponding one of the two extremities of the feed roller;

two flanges, each of the two flanges receiving and supporting a corresponding one of the two lever-lock bearings, each of the two lever-lock bearings being rotatable relative to a corresponding flange between a locked position and an unlocked position;

sensor means for sensing an image of a document, the sensor means being pivotally attached to the two flanges about a pendulum fixation point;

electronic control means for controlling the sensor means and the driving means; and deep input guide means, the guide means creating a small gap immediately over an image sensitive area of the sensor means to avoid contact between the document and the image sensitive area, the guide means being disposed such that the document, when introduced into the guide means, causes the sensor means to pivot to accommodate a thickness of the substantially rigid document between the image sensitive area and the driving means while maintaining the small gap over the image sensitive area, whereby, the feed roller is freely removable when the two lever-lock bearings are in the unlocked position and is secured into place when in the locked position.

14. An image reader according to claim 13, wherein the feed roller is one of coated and lined with a gripping material to grip and feed the document past the image sensor.

15. An image reader according to claim 14, wherein the gripping material is selected from the group consisting of rubber, silicone and foam.

16. An image reader according to claim 13, further comprising retaining means for securing the sensor means in a stable position when the feed roller is removed, thereby enabling easy cleaning of the sensor means and easy repositioning and locking of the feed roller.

17. An image reader according to claim 13, further comprising detection and activation means for automatically activating the feed roller to enable document feeding as soon as the document is detected to have been properly placed and aligned in the image reader.

18. A image reader according to claim 13, further comprising:

an insertion and retrieval slot where the document is inserted and retrieved by human hands; and transport means for transporting the document at least one of away and back from the slot, whereby, the feed roller and the sensor means can be placed at a safe distance from the slot to prevent tampering therewith.

19. An image reader according to claim 15, wherein at least the sensor means and the guiding means have generally wallet-size dimensions to accommodate personal identification cards.

20. An image reader according to claim 13, wherein the lever-lock bearings comprise a circular surface designed to fit in a mating opening in the flanges.

21. An image reader according to claim 13, wherein each lever-lock bearing comprises at least one flat portion which is aligned with at least one corresponding flat portion of a corresponding flange when the lever-lock bearing is in an unlocked position, and which is rotated 90 degrees relative to the at least one flat portion of the corresponding lever-lock bearing when the lever-lock bearing is in a locked position, the lever-lock bearings allowing free rotation of the feed roller when the lever-lock bearings are in a locked position relative to the flanges.

22. An image reader according to claim 21, wherein each of the lever-lock bearings comprise groves, whereby an operator's thumbs may readily and selectively rotate the lever-lock bearings to the locked and unlocked position.

23. An image reader according to claim 13, wherein the lever-lock bearings are made of injection-molded plastic material, whereby, the injection-molded material offers low friction without requiring lubricant to enable a free rotation of the feed roller.

* * * * *